United States Patent
Slabowski

[11] Patent Number: 5,860,345
[45] Date of Patent: Jan. 19, 1999

[54] TRANSVERSELY MOVABLE THREAD SLED

[75] Inventor: Jan Slabowski, Wooddale, Ill.

[73] Assignee: Braner USA, Inc., Schiller Park, Ill.

[21] Appl. No.: 280,369

[22] Filed: Jul. 26, 1994

[51] Int. Cl.⁶ .................................................. B65H 20/16
[52] U.S. Cl. .............................. 83/425.3; 83/552; 83/649
[58] Field of Search ............................. 83/367, 436, 449,
83/480, 481, 563, 649, 650, 953, 412, 407,
552, 559, 954, 425.3, 436.15

[56] References Cited

U.S. PATENT DOCUMENTS

| | | | |
|---|---|---|---|
| 3,448,645 | 6/1969 | Graf et al. | 83/552 X |
| 3,727,503 | 4/1973 | Braner et al. | 83/481 X |
| 3,795,166 | 3/1974 | Brand | 83/650 X |
| 3,882,746 | 5/1975 | Daniels | 83/552 |
| 3,921,486 | 11/1975 | Valente | 83/559 X |
| 4,143,571 | 3/1979 | Oxenham | 83/412 |
| 4,212,218 | 7/1980 | Braner et al. | 83/479 |
| 4,236,431 | 12/1980 | Gawlik et al. | 83/563 X |
| 4,567,799 | 2/1986 | Matsunaga | 83/367 |
| 4,669,346 | 6/1987 | Benedict | 83/412 |
| 5,158,002 | 10/1992 | Matsunaga et al. | 83/552 X |

*Primary Examiner*—Rinaldi I. Rada
*Assistant Examiner*—Elizabeth Stanley
*Attorney, Agent, or Firm*—Baker & Daniels

[57] ABSTRACT

A slitting line includes a slitter, an uncoiler, and a thread sled between the slitter and the uncoiler for peeling material off of a coil of strip material and guiding it into the slitting arbors. The thread sled is displaceable transversely with respect to the material pass line from an active position within the material pass line to an inactive position displaced from the material pass line. When the thread sled is displaced into the inactive position, a substitute pair of slitting arbors that have been retooled may be rotated in a generally horizontal plane into an active position in the material pass line to perform a slitting operation. This thread sled is then displaced back into its active position in the material pass line, where it unpeels material from a coil supported on the uncoiler and guides the leading edge of the material into the retooled slitting arbors.

8 Claims, 3 Drawing Sheets

TRANSVERSELY MOVABLE THREAD SLED

This invention relates to a so-called "thread sled" for peeling sheet material from a coil and threading it between a pair of slitting rules.

Modern slitting lines include a slitter having multiple pairs of arbors. Sheet material is fed along a material pass line from a coil of material mounted on an uncoiler to a working gap defined between one pair of slitting arbors. While one set of arbors is being used to process material, another pair of arbors is rotated out of the material pass line for retooling. When a retooled set of arbors is rotated into the active position to process material, it is desirable to thread sheet material between the arbors as quickly as possible. U.S. Pat. No. 4,567,799 discloses a "thread sled" which is movable along the material pass line from an inactive position adjacent to the uncoiler to an active position adjacent to the slitting arbors. Because the thread sled in the inactive position must provide sufficient clearance with the slitting arbors to permit the latter to be rotated into and out of the active or working position, the length of the slitting line is increased substantially. In modern metal working operations, the length of the line is critical, because the longer the line, the larger the building that must be On the other hand, most buildings housing slitting operations usually have ample room to move the thread sled transversely with respect to the slitting line. Furthermore, in the prior art device disclosed in the above-identified patent, the thread sled must travel several feet each time the arbors are changed to thread the leading edge of the material between the slitting arbors, which substantially increases the time required for the threading operation.

According to the present invention, a thread sled is moved transversely out of the material pass line when the slitting arbors are changed. Accordingly, the length of the slitting line is reduced by the travel distance by the prior art thread sled. Although the thread sled moves transverse to the slitting line, the distance that the thread sled moves is not a problem because the thread sled travel distance does not increase the overall transverse envelope of the slitting line. Furthermore, since the thread sled according the present invention does not need to travel the several additional feet necessary to clear the arbors being rotated between the inactive and active positions, threading the material into the arbors is obviously faster.

These and other advantages of the present invention will become apparent from the following description, with reference to the company drawings, in which.

Figure 1:
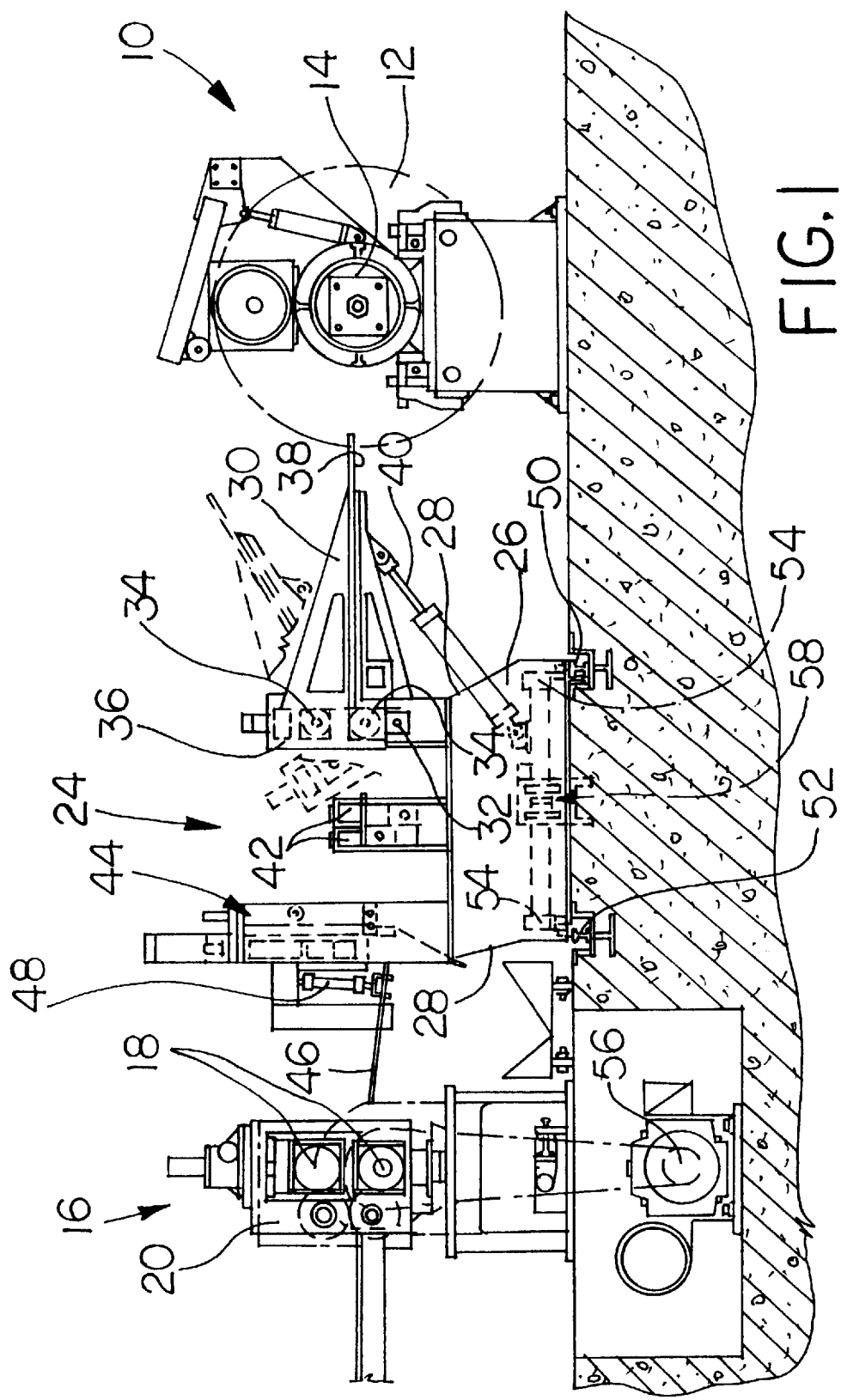
FIG. 1 is a side view of a slitting line incorporating the thread sled of the present invention.

Referring now to the drawings, a slitting line includes an uncoiler generally indicated by the numeral 10 having a coil of sheet material generally indicated by the numeral 12 carried on an arbor 14. A slitter generally indicated by the numeral 16 processes the material uncoiled from the coil of material 12 and includes arbors 18 journalled at one end in a bearing housing 20. Multiple pairs of the arbors 18 are normally provided; during slitting operations one pair of the arbors 18 are displaced from the material pass line defined between the coil 12 and the active pair slitting rollers. The inactive arbors 18 are generally designated by the numeral 22 and are displaced from the material pass line so that they can be retooled. The retooled arbors are later rotated about a generally vertical axis back into the material pass line as the other pair of arbors are rotated out of the material pass line. The bearing housing 20 is then coupled to the free end of the pre-tooled arbors that are being rotated into the active position. The detailed construction operation of the slitter 16 is found in U.S. Pat. No. 4,212,218.

A thread sled generally indicated by the numeral 24 is positioned between the uncoiler 10 and the slitter 16. The sled 24 includes a spaced parallel side frame members 26 which are connected by cross members 28. A pair of side supports 30 are pivotally mounted on thread sled 24 at a pivot point 32. The side supports 30 mount a pair of pinch rollers 34 journalled in bearing blocks 36 which form a part of the side supports 30. A peeling table 38 extends between side supports 30 and projects from the pinch rollers 34 toward the coil 12. Peeling table 38 pivots with side supports 30 and pinch rollers 34. A hydraulic cylinder 40 pivots the side members 30, the pinch rollers 34, and the peeling table 38 about the pivot 32, between the solid and dotted line positions illustrated in FIG. 1.

The hydraulic cylinder 40 elevates the peeling table 38 toward the dotted line position to pick up the end of the sheet material of coil 12 and guide it to the pinch rollers 34. One of the pinch rollers 34 is shiftable toward and away from the other pinch roller to open up a gap to receive the end of the sheet mount material as it moves along the peeling table 38 as the coil 12 is uncoiled. After the edge of the sheet material reaches the rollers 34, the rollers 34 are closed together to grasp the sheet material. One of the rollers 34 is powered to move the sheet material toward the slitter 16. A pair of vertically oriented edge guide rollers 42 are mounted on opposite side edges of sled 24 and engage the opposite side edges of the sheet material to guide the latter as it traverses the sled 24. The sheet material passes from the edge guide rollers 42 through a conventional hydraulically actuated crop shear generally indicated by the numeral 44 which is used to trim the leading edge of the sheet material before it enters the slitter 16. The sheet material is guided into the slitter arbors 18 by a pivotable table 46, the angle which is controlled by a hydraulic cylinder 48.

A pair of substantially horizontally extending rails 50, 52 are mounted to extend at substantially right angles to the material pass line of the sheet material uncoiled from coil 12. Accordingly, the rails 50 and 52 extend substantially parallel to the axis of the arbors 18. The thread sled 24 is provided with rollers 54 which engage the rails 50, 52 and thereby support the thread sled 24 for movement along the rails 50, 52 in a direction transverse to the material pass line between the active position illustrated in FIG. 2 wherein the thread sled 24 is located in the material pass line to an inactive position illustrated in FIG. 3 in which the thread sled 24 is displaced from the material pass line to permit changing of the arbors 18. A prime mover 56 is provided to power the arbors 18 disposed in the active position, and a hydraulic cylinder 58 moves the thread sled 24 between the active and inactive positions.

Figure 2:
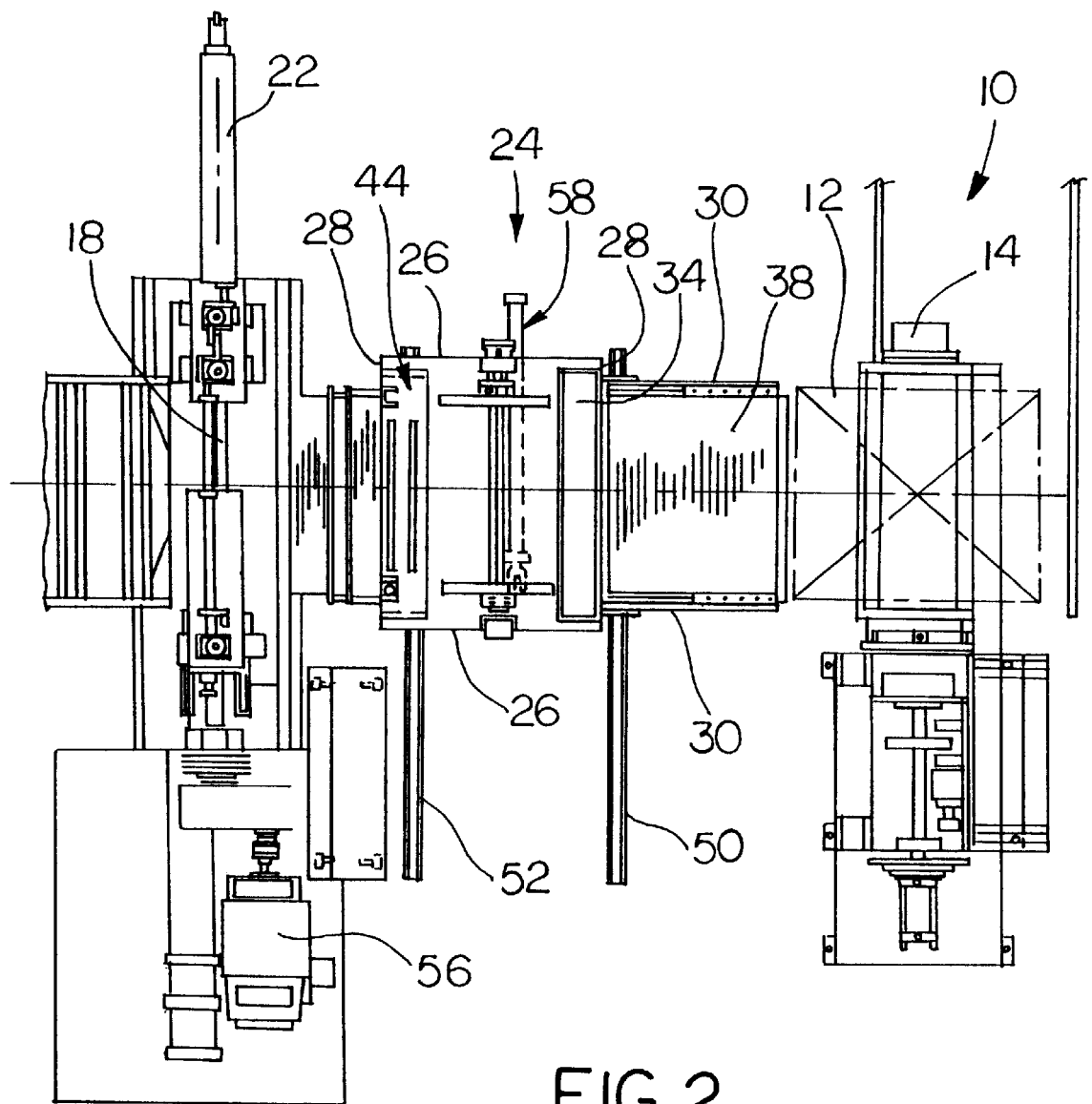
FIG. 2 is a top plan view of the slitting line illustrated FIG. 1 illustrating the thread sled of the present invention in its active or operable position.

In operation, the thread sled 24 is illustrated in FIGS. 1 and 2 in its active position in which it guides material uncoiled from the coil 12 along the material pass line defined between uncoiler 10 and slitter 16 and into the gap between the active slitting arbors 18.

The coil 12 is oriented so that the leading edge of the sheet material is positioned just above the peeling table 38. The peeling table 38 is then elevated by hydraulic cylinder 40 as the coil 12 is turned, thereby guiding the leading edge of the sheet material into the pinch rollers 34. After the leading edge of the sheet material has entered the gap between the rollers 34, the pinch rollers 34 are moved together, and are then rotated to thereby draw material off of the coil 12. The edge guide rollers 42 guide the material onto the table 46, which guides the material into the gap between the slitting arbors 18 where the slitting operation is performed. The leading edge of the sheet material may be cropped off by the operation of crop sheer 44.

While the normal slitting operation is being performed, the inactive slitting arbors 22, which have been rotated out of the material pass line, may be retooled to perform a subsequent slitting operation. When the rolls 22 are rotated into the active position to become the active slitting rolls 18, the thread sled 24 is displaced along the rails 52, 54 by the hydraulic cylinder 58. It will be noted that when the sled 24 is in the displaced or inactive position illustrated in FIG. 3, the inactive set of rolls 22 which has been retooled may be swung into the active position along the arc A illustrated in FIG. 3 and will just clear the corner of the thread sled in the displaced position. After the rolls are installed in the slitter, the sled 24 is moved from the inactive position back to the active position along the material pass line.

Figure 3:
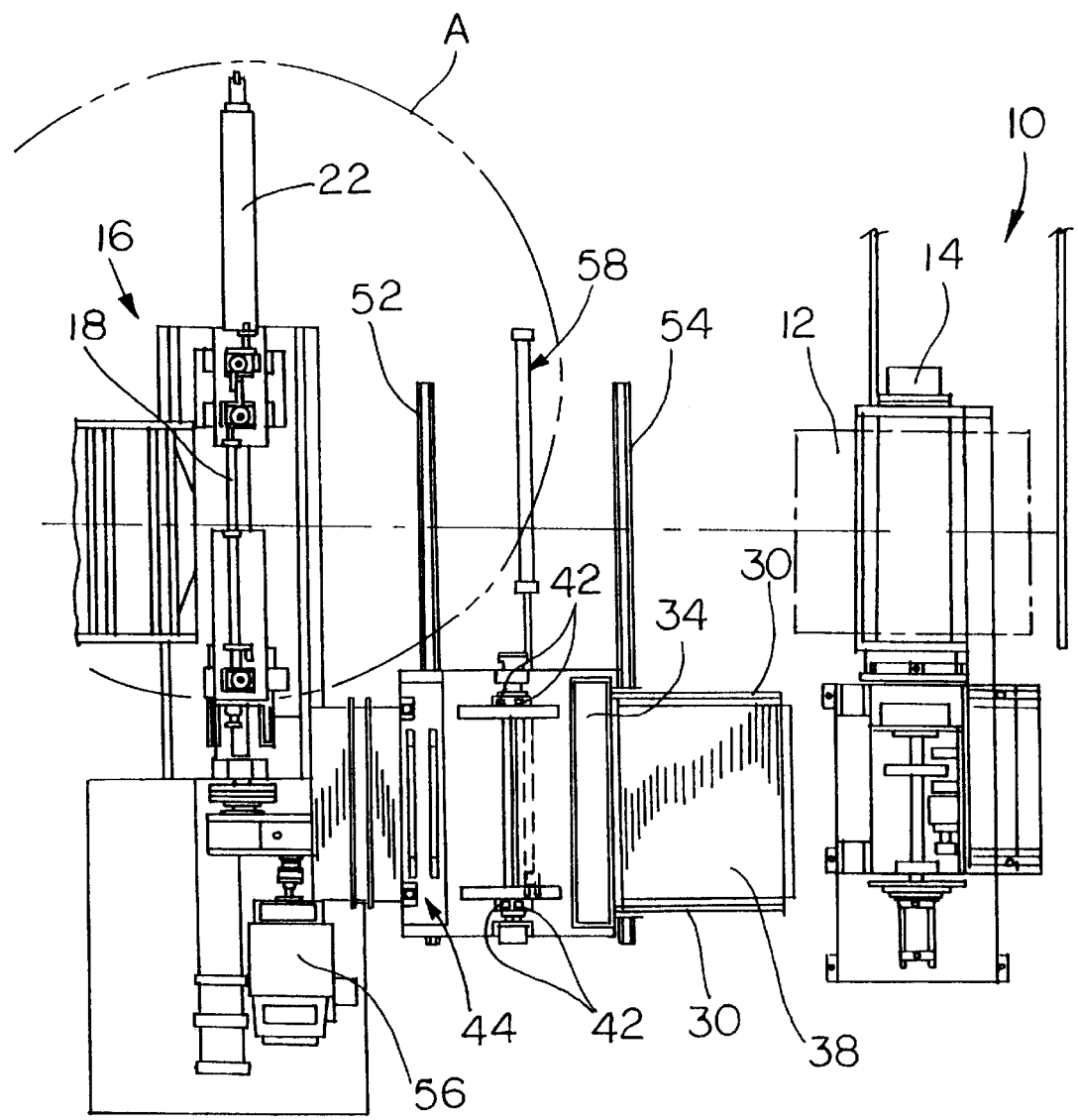
FIG. 3 is a view similar to FIG. 2, but illustrating the thread sled in its inactive or displaced position, which permits the slitting arbors to be changed.

In the prior art slitting line disclosed in U.S. Pat. No. 4,567,799, the thread sled moves longitudinally between the slitter and the uncoiler. When the thread sled is in the inactive position adjacent the uncoiler, the peeler directs the leading edge of the sheet material onto the pinch rolls of the thread sled, which is then moved along the material pass line to thread the material between the active slitting arbors 18. This not only requires a not considerable amount of time, since the thread sled must move the distance between the uncoiler and slitter, but also substantially increase the length of the slitting line. In the present invention, as seen in FIG. 3, the thread sled 24 is displaced transversely with respect to the material pass line, thereby reducing the length of the slitting line and reducing the time required to thread material into the arbors, since the thread sled does not have to travel the distance between the uncoiler and slitter every time that a new coil of material is installed on the uncoiler. The overall width required by the slitting line is not increased, because the transverse envelope of the slitting line is governed by other equipment such as the prime mover 56. Accordingly, the length of the slitting line has been substantially reduced, with no increase in the overall transverse envelope required.

I claim:

1. Slitting line comprising a slitter having multiple pairs of slitting arbors, each of said pairs of slitting arbors being rotatable in a general horizontal plane between an active position across a material pass line and an inactive position out of said material pass line, each of said pairs of slitting arbors when in said active position being rotatable about axes disposed in generally parallel horizontal planes, an uncoiler having a spindle for carrying a coil of sheet material, said coil being oriented by said uncoiler in said material pass line whereby material can be unpeeled from said coil and delivered to said slitting arbors along said material pass line, a sled movable from an active position in said material pass line to an inactive position out of said material pass line, said sled in said active position being between the slitter and the uncoiler, said sled including an unpeeler for unpeeling material from said coil and a pair of pinch rollers for guiding the material to said slitter when the sled is in the active position, mounting means for mounting said sled for movement relative to said slitting arbors and said uncoiler, said mounting means including guide means for guiding said sled along a rectilinear path extending in a direction other than along the material pass line, and means for moving said sled along said path between said active and inactive positions.

2. Slitting line as claimed in claim 1, wherein said path extends horizontally and transverse to said material pass line.

3. Slitting line as claimed in claim 1, wherein said mounting means guides said sled for movement in a direction substantially parallel to the axes of the slitting arbors.

4. Slitting line as claimed in claim 1, wherein said guide means guides said sled along a path extending substantially perpendicular to the material pass line.

5. Slitting line as claimed in claim 1, wherein said guide means includes a pair of rails and, said mounting means includes wheels carried by the sled for engagement with the rails.

6. Slitting line as claimed in claim 5, wherein said pair of rails extends substantially parallel to the axes of the slitting arbors.

7. Slitting line as claimed in claim 5, wherein said pair of rails extends substantially perpendicular to the material pass line.

8. Slitting line as claimed in claim 5, wherein said pair of rails extends in a horizontal plane and also extend transversely with respect to the material pass line.

\* \* \* \* \*